(12) United States Patent
Gao et al.

(10) Patent No.: US 10,673,487 B2
(45) Date of Patent: Jun. 2, 2020

(54) METHOD, SYSTEM AND APPARATUS TO OPTIMIZE A4WP WIRELESS CHARGING AND NFC CO-EXISTENCE

(71) Applicant: Intel Corporation, Santa Clara, CA (US)

(72) Inventors: Jie Gao, Sunnyvale, CA (US); Songnan Yang, San Jose, CA (US); Anand S. Konanur, Sunnyvale, CA (US); Xintian Lin, Mountain View, CA (US); Ulun Karacaoglu, San Diego, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/862,423

(22) Filed: Sep. 23, 2015

(65) Prior Publication Data

US 2017/0085297 A1    Mar. 23, 2017

(51) Int. Cl.
| | |
|---|---|
| *H04B 5/00* | (2006.01) |
| *H04L 12/26* | (2006.01) |
| *H02J 7/02* | (2016.01) |
| *H04W 4/00* | (2018.01) |
| *H02J 50/20* | (2016.01) |
| *H02J 50/80* | (2016.01) |
| *H04W 4/80* | (2018.01) |

(52) U.S. Cl.
CPC .......... *H04B 5/0037* (2013.01); *H02J 7/025* (2013.01); *H02J 50/20* (2016.02); *H02J 50/80* (2016.02); *H04B 5/0081* (2013.01); *H04W 4/80* (2018.02)

(58) Field of Classification Search
CPC ..... H02J 7/025; H04B 5/0037; H04B 5/0081; H04L 43/10; H04W 4/008; A61N 1/3787
See application file for complete search history.

(56) References Cited

U.S. PATENT DOCUMENTS

| 5,598,407 A * | 1/1997 | Bud ...................... H04W 84/12 370/330 |
|---|---|---|
| 2006/0198364 A1* | 9/2006 | Fujii ...................... H04L 27/02 370/352 |
| 2008/0272889 A1* | 11/2008 | Symons ................. H02J 7/025 340/10.1 |
| 2012/0080957 A1* | 4/2012 | Cooper ................. H02J 5/005 307/104 |

(Continued)

OTHER PUBLICATIONS

Xiao Lu et al., Wireless Charger Networking for Mobile Devices: Fundamentals, Standards, and Applications, arXiv:1410.8635v2 [cs.NI], Dec. 9, 2014, 16 pages.

*Primary Examiner* — Richard Isla
*Assistant Examiner* — Dung V Bui
(74) *Attorney, Agent, or Firm* — Spectrum IP Law Group LLC (57) ABSTRACT

The disclosure relates generally to method, system and apparatus to optimize wireless charging to identify a proximal Near-Field Communication (NFC) tag and prevent damage by a magnetic wireless charging field. The disclosed embodiment provide different methods for NFC tag detection without impacting A4WP wireless charging. In an exemplary method, dedicated NFC reader is used to interleave the NFC and A4WP signals on the same coil. In one implementation the signals are frequency-multiplexed. In another implementation, the signals are time-multiplexed.

33 Claims, 8 Drawing Sheets

(56) References Cited

U.S. PATENT DOCUMENTS

| | | | | |
|---|---|---|---|---|
| 2012/0196529 A1* | 8/2012 | Huomo | ............... | G06Q 20/045 |
| | | | | 455/41.1 |
| 2012/0235636 A1* | 9/2012 | Partovi | ................. | H02J 7/025 |
| | | | | 320/108 |
| 2012/0315843 A1* | 12/2012 | Cox | ................. | H04W 52/0274 |
| | | | | 455/41.1 |
| 2013/0062959 A1* | 3/2013 | Lee | ..................... | H04B 5/0031 |
| | | | | 307/104 |
| 2013/0210352 A1* | 8/2013 | Ling | ..................... | H04W 4/80 |
| | | | | 455/41.1 |
| 2013/0267173 A1* | 10/2013 | Ling | ........................ | H04B 5/00 |
| | | | | 455/41.1 |
| 2014/0181955 A1* | 6/2014 | Rosati | .................... | G06F 21/44 |
| | | | | 726/18 |
| 2014/0187154 A1* | 7/2014 | Sabouri | ............ | H04W 52/0245 |
| | | | | 455/41.1 |
| 2014/0327320 A1* | 11/2014 | Muhs | .................. | H04B 5/0037 |
| | | | | 307/104 |
| 2014/0378059 A1* | 12/2014 | Ouchi | .................... | H04W 4/80 |
| | | | | 455/41.2 |
| 2015/0001952 A1* | 1/2015 | Chiba | ................. | H04B 5/0031 |
| | | | | 307/104 |
| 2015/0008756 A1* | 1/2015 | Lee | ........................ | H02J 17/00 |
| | | | | 307/104 |
| 2015/0044964 A1* | 2/2015 | Khan | ...................... | G06F 21/35 |
| | | | | 455/41.1 |
| 2015/0054454 A1* | 2/2015 | White, II | ............ | H04B 5/0075 |
| | | | | 320/108 |
| 2015/0116296 A1* | 4/2015 | Greene | ............... | H04B 5/0037 |
| | | | | 345/211 |

\* cited by examiner

METHOD, SYSTEM AND APPARATUS TO OPTIMIZE A4WP WIRELESS CHARGING AND NFC CO-EXISTENCE

BACKGROUND

Field

The disclosure relates generally to a method, system and apparatus to optimize wireless charging stations. Specifically, the specification relates to methods, system and apparatus to optimize wireless charging to enable co-existence with a proximal NFC tag.

Description of Related Art

Wireless charging or inductive charging uses a magnetic field to transfer energy between two devices. Wireless charging can be implemented at a charging station. Energy is sent from one device to another device through an inductive coupling. The inductive coupling is used to charge batteries or run the receiving device. The Alliance for Wireless Power (A4WP) was formed to create industry standard to deliver power through non-radiative, near field, magnetic resonance from the Power Transmitting Unit (PTU) to a Power Receiving Unit (PRU).

The A4WP defines five categories of PRU parameterized by the maximum power delivered out of the PRU resonator. Category 1 is directed to lower power applications (e.g., Bluetooth headsets). Category 2 is directed to devices with power output of about 3.5 W and Category 3 devices have an output of about 6.5 W. Categories 4 and 5 are directed to higher-power applications (e.g., tablets, netbooks and laptops).

PTUs of A4WP use an induction coil to generate a magnetic field from within a charging base station, and a second induction coil in the PRU (i.e., portable device) takes power from the magnetic field and converts the power back into electrical current to charge the battery. In this manner, the two proximal induction coils form an electrical transformer. Greater distances between sender and receiver coils can be achieved when the inductive charging system uses magnetic resonance coupling. Magnetic resonance coupling is the near field wireless transmission of electrical energy between two coils that are tuned to resonate at the same frequency.

Wireless charging is particularly important for fast wireless charging of devices including smartphones, tablets and laptops. There is a need for improved wireless charging systems to extend the active charging area and to improve coupling and charging uniformity while avoiding disruption of nearby devices that may be damaged by the generated magnetic field.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

Certain embodiments may be used in conjunction with various devices and systems, for example, a mobile phone, a smartphone, a laptop computer, a sensor device, a Bluetooth (BT) device, an Ultrabook™, a notebook computer, a tablet computer, a handheld device, a Personal Digital Assistant (PDA) device, a handheld PDA device, an on board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AV) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Institute of Electrical and Electronics Engineers (IEEE) standards (IEEE 802.11-2012, IEEE Standard for Information technology-Telecommunications and information exchange between systems Local and metropolitan area networks—Specific requirements Part 11: Wireless LAN Medium Access Control (MAC) and Physical Layer (PHY) Specifications, Mar. 29, 2012; IEEE 802.11 task group ac (TGac) ("IEEE 802.11-09/0308r12—TGac Channel Model Addendum Document"); IEEE 802.11 task group ad (TGad) (IEEE 802.11ad-2012, IEEE Standard for Information Technology and brought to market under the WiGig brand—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012)) and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, devices and/or networks operating in accordance with existing Wireless HDTM specifications and/or future versions and/or derivatives thereof, units and/or devices which are part of the above networks, and the like.

Some embodiments may be implemented in conjunction with the BT and/or Bluetooth low energy (BLE) standard. As briefly discussed, BT and BLE are wireless technology standard for exchanging data over short distances using short-wavelength UHF radio waves in the industrial, scientific and medical (ISM) radio bands (i.e., bands from 2400-

2483.5 MHz). BT connects fixed and mobile devices by building personal area networks (PANs). Bluetooth uses frequency-hopping spread spectrum. The transmitted data are divided into packets and each packet is transmitted on one of the 79 designated BT channels. Each channel has a bandwidth of 1 MHz. A recently developed BT implementation, Bluetooth 4.0, uses 2 MHz spacing which allows for 40 channels.

Some embodiments may be used in conjunction with one way and/or two-way radio communication systems, a BT device, a BLE device, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like. Some demonstrative embodiments may be used in conjunction with a WLAN. Other embodiments may be used in conjunction with any other suitable wireless communication network, for example, a wireless area network, a "piconet", a WPAN, a WVAN and the like.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Electromagnetic induction based Wireless charging and Near Field Communication (NFC) are two technologies that are based on inductive coupling between two coils. Wireless charging based on A4WP is using 6.78 MHz industrial, scientific or medical (ISM) frequency band to deliver power between wireless charger and device, while NFC (and some other RFID technologies) is using 13.56 MHz ISM frequency band to deliver power and data between devices.

Conventional A4WP standard uses lost-power calculation to determine if a rogue or foreign object or device is at or near the magnetic charging field. The conventional methods conduct the lost-power calculation in the following manner. A wireless power charger knows the output power of its PTU coil. A PRU under charge communicates back to the PTU charger as to how much power it has received during a given period. If the received power is smaller than the transmit power, then some of the power has been lost. If the lost power is large enough (e.g., larger than a pre-defined threshold), then the charger will conclude that a rogue object is positioned at or near the charging pad. When a rogue object is detected, the power transfer will cease and the wireless charging system will revert to its latching fault (off) state.

Figure 1:
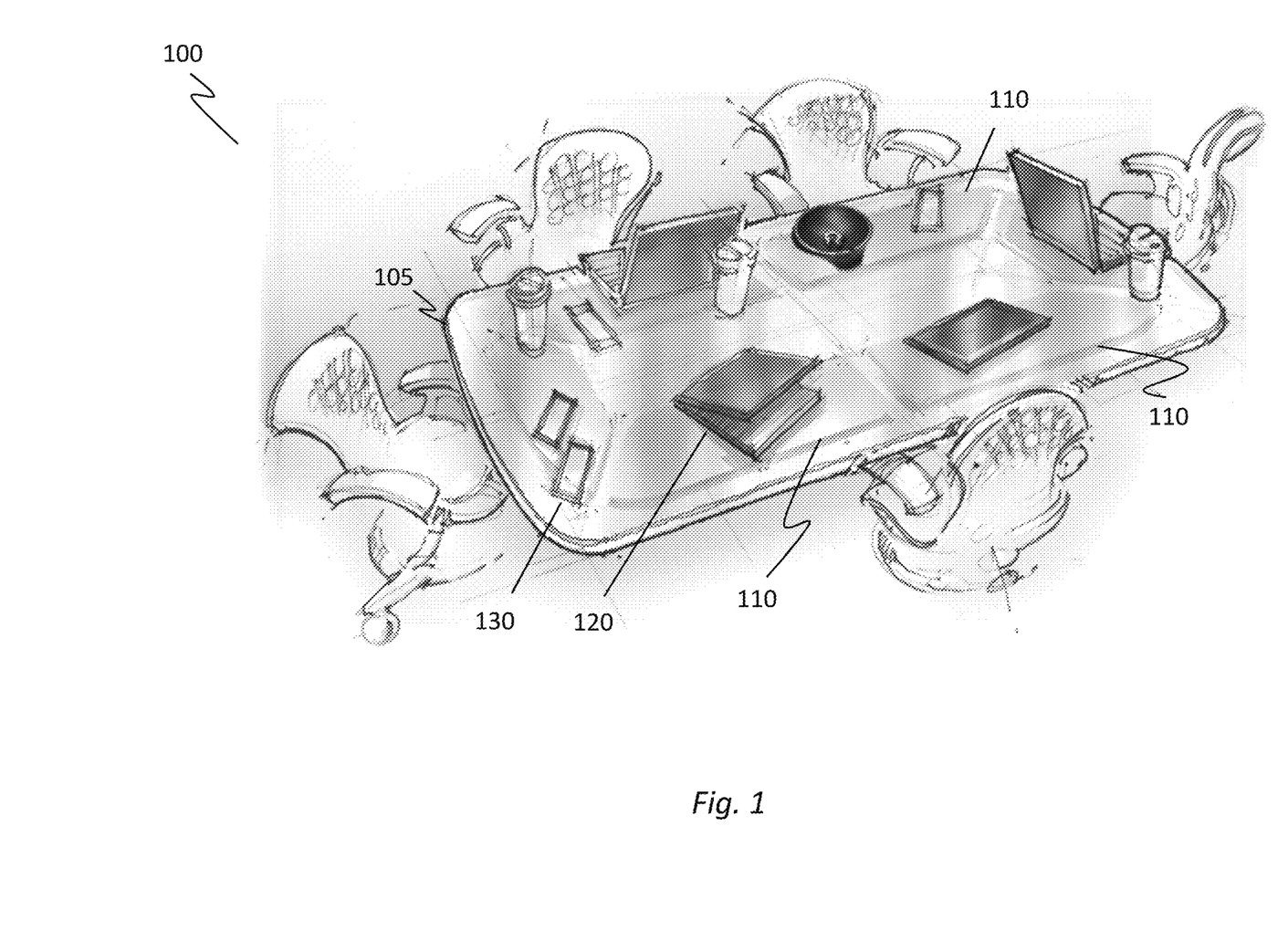
FIG. 1 illustrates an exemplary wireless charging environment according to one embodiment of the disclosure.

FIG. 1 illustrates an exemplary wireless charging environment according to one embodiment of the disclosure. In FIG. 1, conference room 100 is shown with wireless charging pads (i.e., PTUs) 110 positioned on desk 105. Each PTU 110 is designated to support one or more PRUs. While FIG. 1 shows PRUs including laptop 120 and smart devices 130, the disclosed principles are not limited thereto and may include any device capable of wireless charging.

Figure 2:
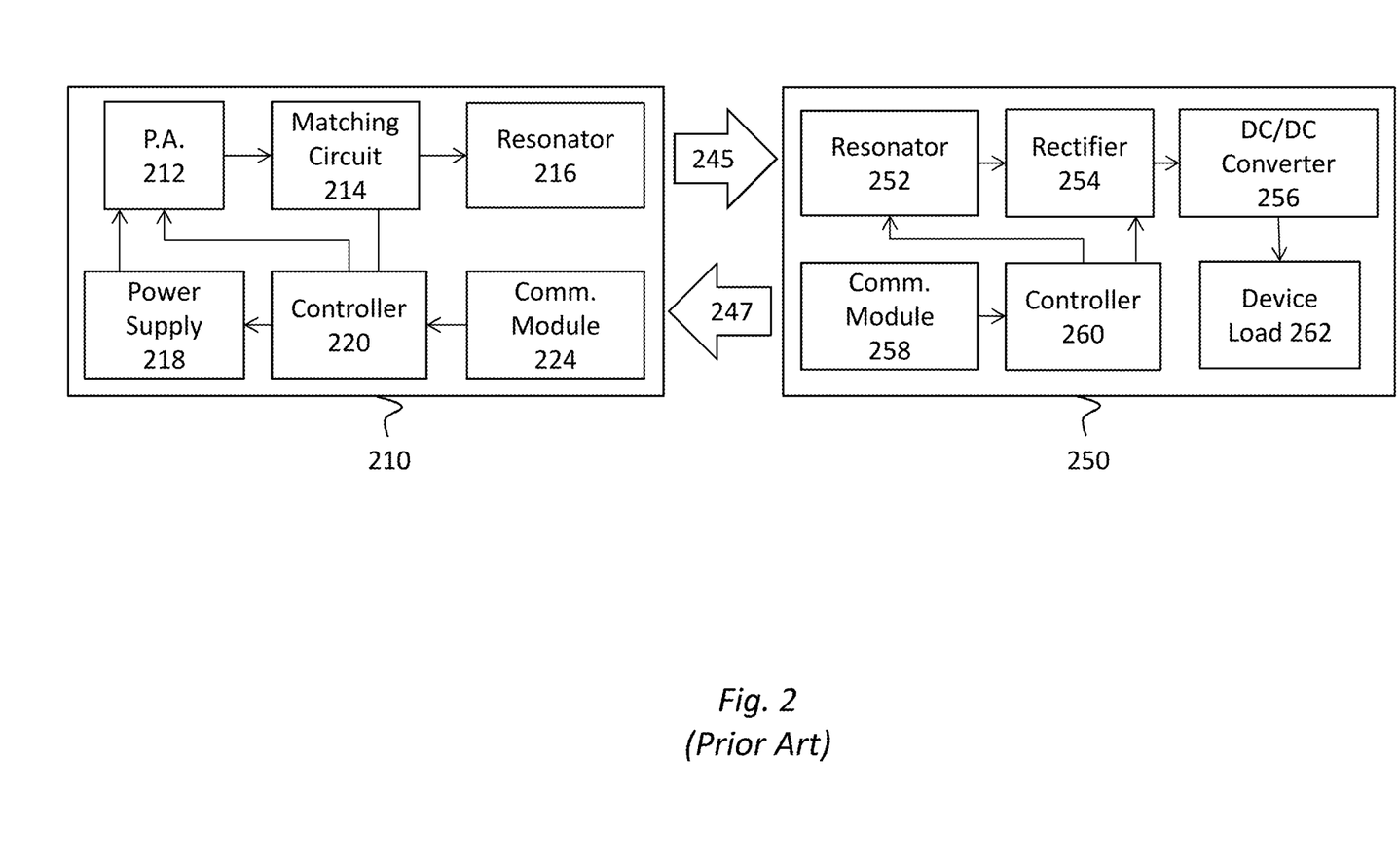
FIG. 2 schematically illustrates conventional A4WP architecture.

FIG. 2 schematically illustrates conventional A4WP architecture. Specifically, FIG. 2 shows PTU 210 and PRU 250. PTU 210 can be any conventional wireless charging station. PTU 210 includes power supply 218, power amplifier (PA) 212, matching circuit 214, controller 220, resonator coil 216 (interchangeably, resonator) and communication module 224. Communication module 224 may define BLE communication platform to transceive BLE packets and communicate the packets to controller 220. PA 212 receives primary power from power supply 218 (which may be an AC source) and generates an amplified A4WP power signal according to instructions from controller 220. Matching circuit 214 receive A4WP power signals from PA 212 and provide substantially constant power to resonator 216. Resonator 216 may include one or more resonator coils to convert output from matching circuit 214 to magnetic field for wireless device positioned within the charging zone of PTU 210.

PRU 250 may define any device under charge (DUC) which proximal to PTU 210. PRY 250 is shown with resonator coil 252, rectifier 254, DC/DC converter 256, communication module 258, controller 260 and device load 262. Communication module 258 includes BLE communication platform to communicate 247 with communication module 224 of PTU 210. Resonator coil 252 receives magnetic field 245 of PTU resonator 216. Rectifier 254 conforms magnetic field (power) received at resonator 252 and provides appropriate signal to DC/DC converter 256. Controller 260 of PRU 250 communicates with resonator 252 and rectifier 254 in order to manage received power. The output of DC/DC converter 256 powers device load (e.g., battery) 262.

Conventional PTUs can detect magnetic power absorbed by DUC as well as power loss due to large rogue objects. However, conventional lost-power algorithms are unable to detect small NFC devices (or RFID) such as NFC sticker or tag because since the power change is less than the detection threshold of conventional wireless chargers. Moreover, the NFC and RFID devices (among others) are not designed to effectively capture magnetic field, tune into a non-interfering frequency or reject out-of-channel interference. Consequently, the wireless magnetic field (charging interference at 6.78 MHz) is absorbed by the device, heating and damaging the device. Conventional A4WP chargers have been found to damage proximally positioned NFC and RFID devices and there is no known solution to detect the low power device such as NFC tag. The exemplary embodiments disclosed herein overcome these and other shortcomings of the conventional A4WP chargers.

Figure 3:
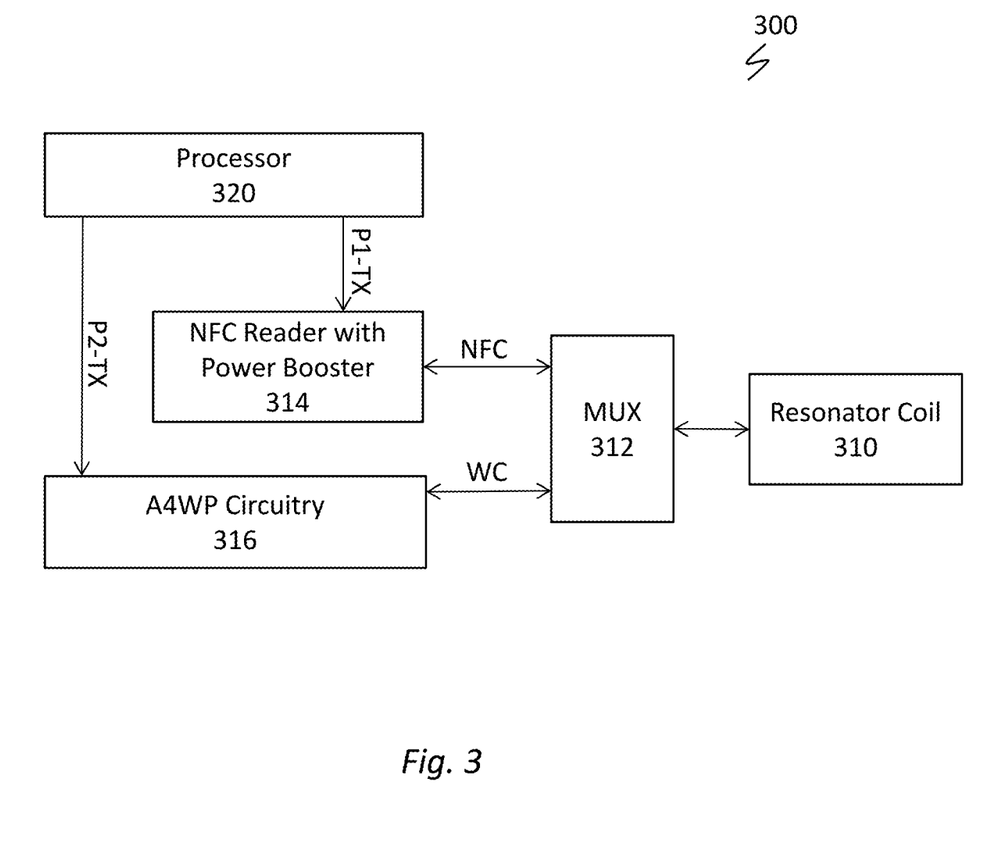
FIG. 3 shows a wireless charging multiplexer according to one embodiment of the disclosure.

FIG. 3 shows a wireless charging multiplexer according to one embodiment of the disclosure. Specifically, FIG. 3 shows a frequency multiplexing device 300 including processor 320, NFC reader (with optional power booster) 314, A4WP circuitry 316, multiplexer (MUX) 312 and resonator coil 310. Among others, device 300 enables continuous external device (e.g., NFC tag) detection and wireless charging. In one implementation, the same resonator coil is used for both NFC communication and A4WP power delivery. Multiplexer 312 enables frequency selectivity for the non-concurrent radio operation.

NFC reader 314 may be integrated with the PTU or may be added as a separate module. NFC reader 314 can be a dedicated NFC reader and communicate directly with MUX 312 to multiplex the signal on wireless resonator coil 310. In an embodiment, frequency multiplexing is used to identify a nearby NFC tag. In another embodiment, time multiplexing may be used to identify a nearby NFC tag.

A4WP circuitry 316 may comprise wireless charging circuitry including, for example, matching circuitry and PA. Processor 320 may comprise controller (not shown) circuitry and memory circuitry (not shown) to direct components of device 300. Processor 320 may communicate current values to A4WP circuitry 316 through control signals (P2-Tx). The control signal may direct A4WP circuitry 316 to cause resonator coil 310 to produce desired magnetic field.

Processor 320 may also communicate current values to NFC reader 314 through control signals (P1-TX). The control signals can provide desired parameters for controlling the current value produced by NFC Reader 314. NFC reader 314 may optionally include power booster circuitry (not shown) to increase NFC signal strength as needed. In the embodiment of FIG. 3, NFC reader 314 enables accurate detection of NFC tags continually without impacting user's wireless charging experience. For example, the device of FIG. 3 may be used to continuously detect NFC tags while such devices are entering the wireless charging zone. After an initial detection in the NFC detection zone, device 300 may send power reduction notice to the PRU via BLE link (not shown) while simultaneously lowering the A4WP field briefly to shrink the wireless charging zone. The lowering of the A4WP charging zone allows device 300 to confirm detection of the NFC tag to thereby avoid false detection.

Figure 4:
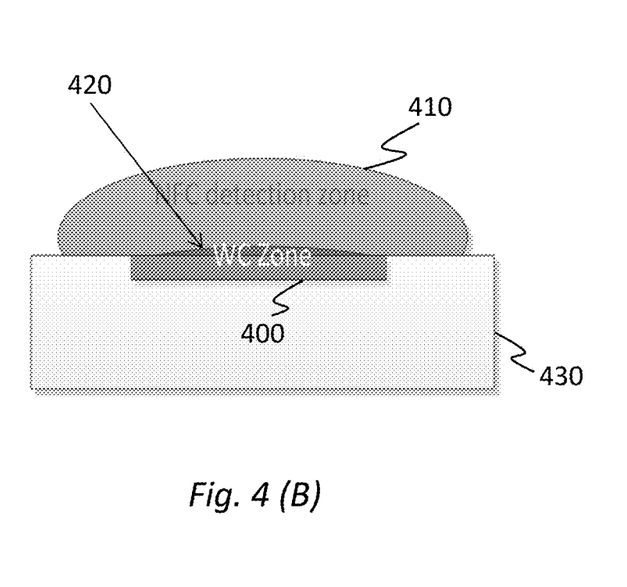
FIG. 4(A) illustrates a first NFC detection phase according to one implementation of the disclosure.
FIG. 4(B) illustrates a second NFC detection phase according to one implementation of the disclosure.

FIGS. 4(A) and 4(B) schematically illustrate one application of the device 300 of FIG. 3. Specifically, FIG. 4(A) illustrates a first NFC detection phase according to one implementation of the disclosure. Each of NFC and A4WP charging field creates its own magnetic field. In FIGS. 4(A) and 4(B), each magnetic field is represented as a bubble. The size and strength of the bubble is determined by the transmit current (I_Tx) supplied to the resonator coil 400. In FIG. 4(A), the first detection phase shows NFC detection zone 410 and Wireless Charging (WC) detection zone 420 on PTU coil 400. In this state, the NFC detection field 410 is greater than the WC field 420. Both NFC and A4WP fields are there initially but NFC detection zone is larger than the WC zone.

After an initial detection of an object in NFC detection zone 410 of FIG. 4(A), the resonator coil 400 may be dialed down so as to reduce the WC charging zone 420. The reduction of WC zone 420 may be done to confirm detection of an external device (e.g., NFC tag) on mat 430. The secondary detection substantially eliminates false detection cases. As shown in FIGS. 4(A) and 4(B), PTU resonator coil 400 simultaneously generates NFC signal and WC magnetic field. In other words, upon valid NFC detection in FIG. 4(A), WC field 420 is reduced for on the mat detection of the NFC (as shown in FIG. 4(B)).

Once presence of a proximal NFC tag is confirmed, the PTU may send appropriate indication(s) to alert the user. For example, the PUT may display an light emitting diode (LED) message on the charging matt or may sound an alarm to warn the user of potential damage to the tag. In an exemplary embodiment, BLE advertising messages may be sent from the PTU to the PRU to notify PRU of the potential damage. In still another embodiment, remedial measures can be taken at the PTU to protect the NFC tag. The remedial measures may include entering a fault state or discontinuing wireless charging.

Figure 5:
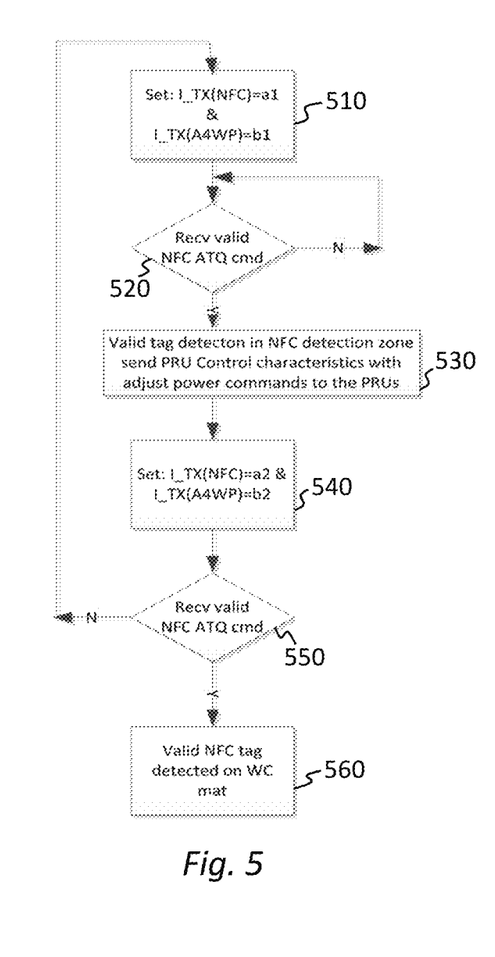
FIG. 5 shows an exemplary flow diagram for multi-phase detection shown in FIGS. 4(A) and 4(B)

FIG. 5 shows an exemplary flow diagram for multi-phase detection shown in FIGS. 4(A) and 4(B). The process of FIG. 5 starts at step 510 when a controller and/or processor (e.g., processor 320, FIG. 3) transmits current setting signal (I_TX) to the coil. In FIG. 5, the controller sends corresponding control signals for each of NFC (i.e., I_TC(NFC)) and WC control signal (i.e., I_TX (WP)) to a PTU resonator coil (e.g., resonator coil 310, FIG. 3). The control parameters can be used to set the size and reach of the NFC and WC zones. In step 510, notations "a" and "b" are parameters required to sustain the desired radius of the NFC readable zone (e.g., NFC detection zone 410, FIGS. 4(A) and 4(B)).

Once the NFC detection zone is configured, period NFC inquiries are sent by the resonator coil (not shown). The inquiries can be, for example, NFC commands. At step 520, a determination is made as to whether an answer to query (ATQ) is received responsive to the NFC inquiries. If no ATQ is received, the initial settings may be maintained or adjusted to change the NFC/WC zones.

If an ATQ is received, at step 530, a valid tag detection is made in the NFC detection zone (i.e., zone 410, FIG. 4(A)). In one embodiment, the PTU sends control parameters to PRU. The control parameters may include a request to adjust power. The request may be communicated using BLE messaging. PTU notifies PRU that PTU is about to deliver less power. Thus, PRU is prepared to receive a lower power when lower I_TX is supplied to the wireless charging PTU coil.

At step 540, the resonator parameters (e.g., a1 and b2) are adjusted to new values, a2 and b2. The adjusted parameters change the size of the NFC and WC zones as shown in FIG. 4(B). A second inquiry can be made at step 540 to confirm presence of an a proximal device. At step 550, inquiry is made as to whether a valid ATQ is received. If an ATQ is received, then presence of a proximal NFC tag is confirmed and at step 560 corresponding indication can be made to alert the user or to protect the device from damage. If an ATQ is not received, the process reverts back to step 510.

Certain embodiments of the disclosure relates to scheduling or multiplexing separate time slots to interleave periodic NFC polling and A4WP power delivery. In this manner, a multiplexer can be used to time-multiplex the NFC and A4WP fields. During NFC polling period, the PTU may transmit the least amount of energy to power the PRU(s). One or more BLE packets may be transmitted from the PTU to notice the PRU of the A4WP charging power reduction.

Figure 6:
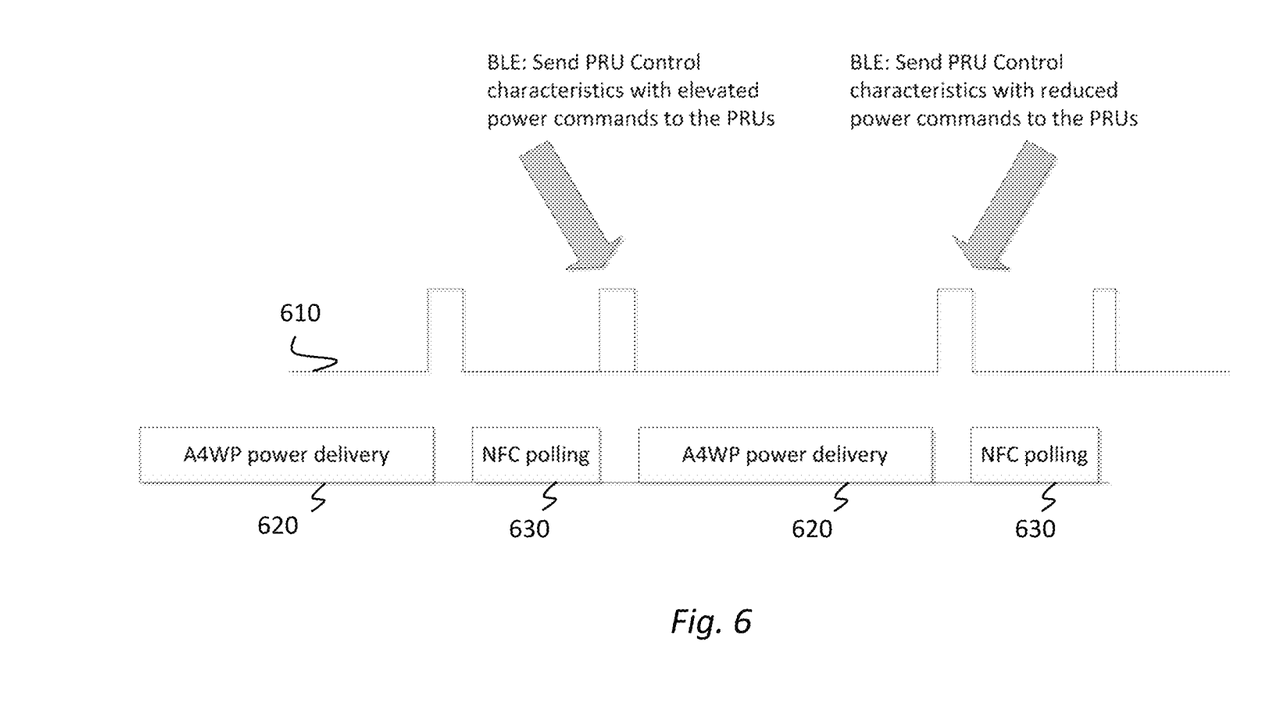
FIG. 6 shows an exemplary timing sequence for BLE signaling and periodic NFC/A4WP signaling.

FIG. 6 shows an exemplary timing sequence for BLE signaling and periodic NFC/A4WP signaling. In FIG. 6, signal 610 represents periodic BLE communication between PTU and one or more proximal PRUs. In one embodiment, the communication pulses occur every 250 msec. The BLE commands of FIG. 6 include PRU control characteristics (e.g., control parameters a1, b1) to elevate or to reduce power emitted by PRU. FIG. 6 also shows the interleaving of A4WP power delivery 620 and NFC polling 630. In an exemplary embodiment, a multiplexer (e.g., MUX 312, FIG. 3) may direct a resonator (e.g., resonator coil 310, FIG. 3) to interleave power delivery 620 and NFC polling 630 with a defined gap therebetween. The gap can be timed to allow BLE signaling as shown. During the NFC polling period 630, the A4WP PTU transmits the least (or lower) amount of energy to power on the PRU(s). Prior to the start of the NFC polling period, the BLE may send PRU control characteristics with elevated power commands to the PRU(s). During the A4WP power delivery state 620, the PTU transmits optimal magnetic field to charge the PRU(s). Prior starting state 620, PTU may send BLE packets with PRU control characteristics with elevated power commands to the PRU(s).

Figure 7:
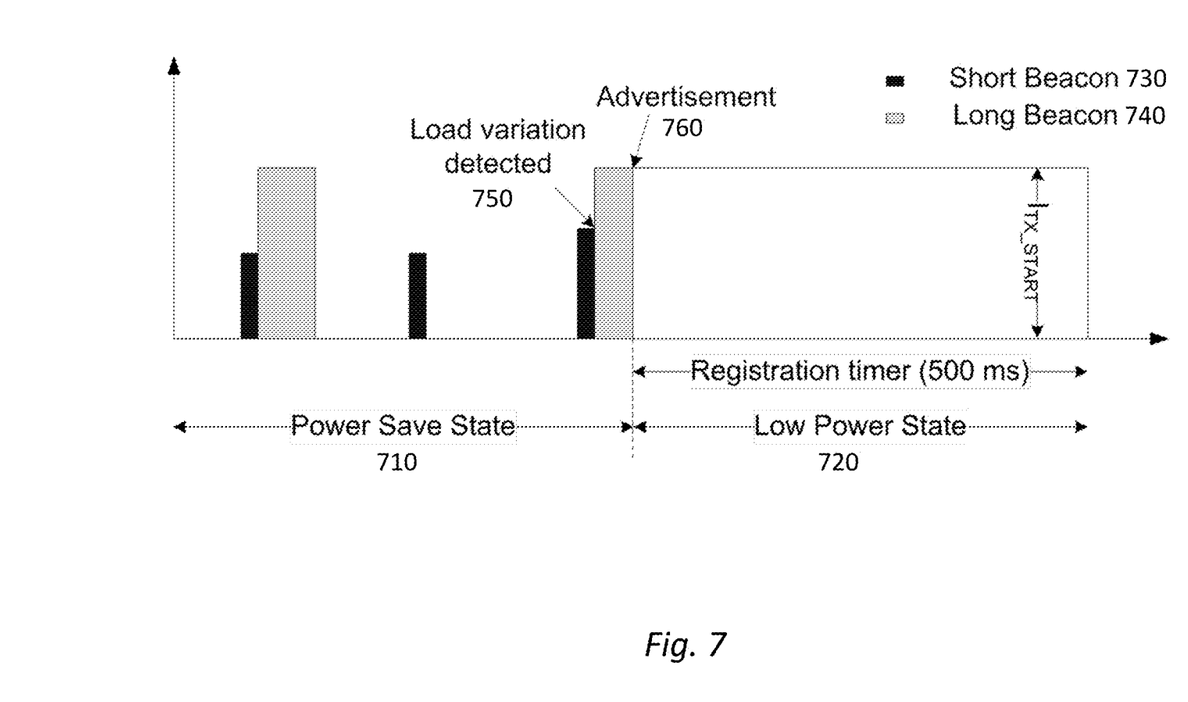
FIG. 7 shows short beacon sequence of conventional A4WP charging systems.

FIG. 7 shows short beacon sequence of conventional A4WP charging systems. Specifically, FIG. 7 shows Power Save State 710 and Low Power State 720 of a conventional PTU. During the Power Save State 710, the PTU issues short beacon 730. If a load variation is detected in response to the short beacon, then long beacon 740 is issued. If load variation is not detected, then another periodic short beacon 730 is issued.

When a load variation due to an external device is detected after a short beacon 750, a long beacon is followed. Then registration of wireless charging PRU device via BLE may start. In one embodiment and for the method of time multiplexing of NFC detection phase and A4WP WC phase, I_TX follows the standard need not be modified.

Figure 8:
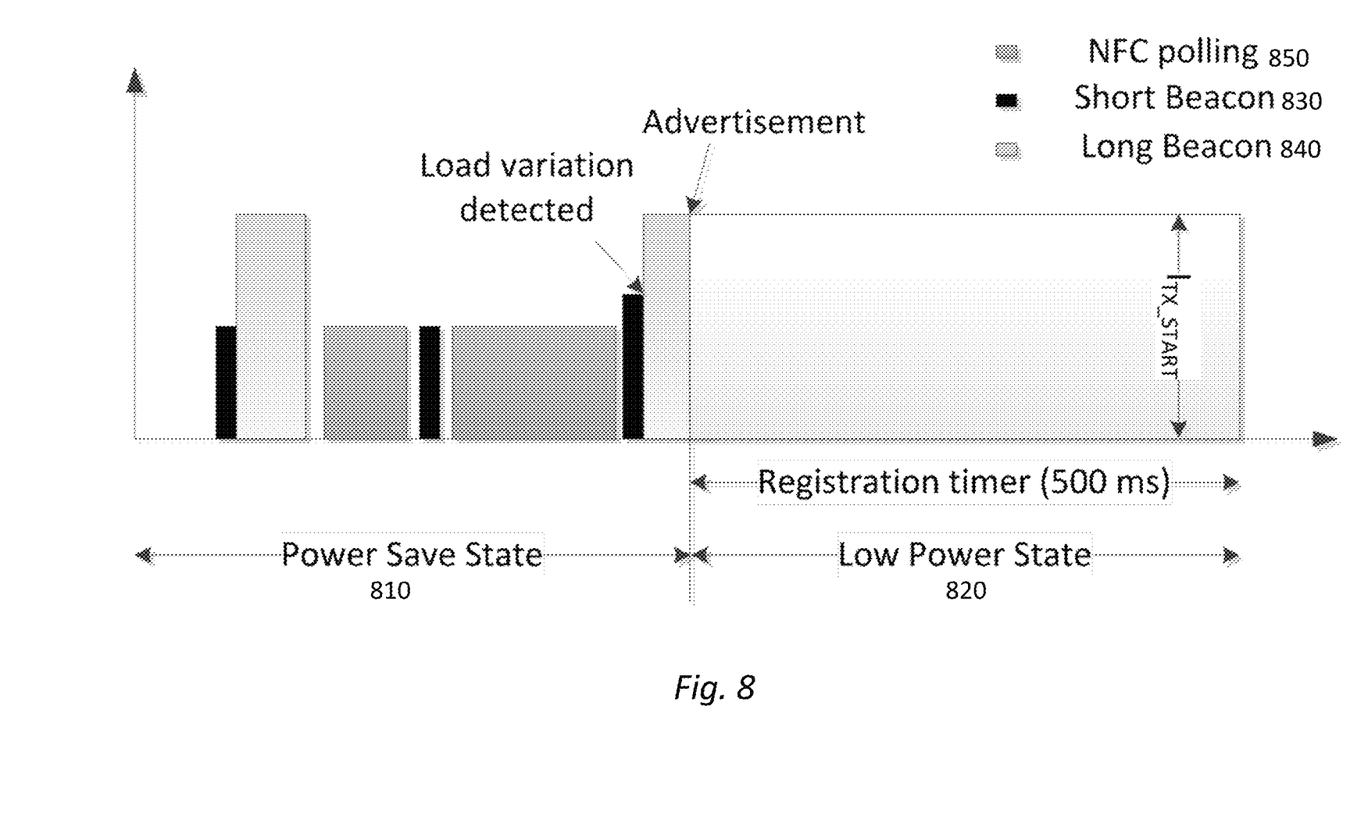
FIG. 8 shows the timing of multiplexed NFC polling and A4WP charging according to one embodiment of the disclosure.

FIG. 8 shows the timing of multiplexed NFC polling and A4WP charging according to one embodiment of the disclosure. In FIG. 8, an NFC polling session is added between beacon intervals. The NFC polling may be implemented after short beacon, long beacon or both. In one embodiment, the NFC polling is implemented during power save state. In FIG. 8, NFC polling is shown between two short intervals. If a short beacon detects load variation which indicates PRU presence, then NFC polling may be postponed until after long beacon 840. Thus, the NFC polling is periodically administrated during power save state 810.

The timing sequence shown in FIG. 8 can be implemented in a controller in communication with the PTU and BLE platform. The controller may comprise a processor circuitry in communication with a memory circuitry. The processor may comprise hardware, software or a combination of hardware and software. Similarly, the memory may include hardware, software or a combination of hardware and software. The memory may store instructions which may be executed on the processor circuitry to, for example, initiate short beacon 830, detect a proximal device by way of load detection, initiate long beacon 840 as needed and/or imitate NFC polling 850 during available time slots of power save state 810. In one embodiment, the controller may be integrated with processor 320 of FIG. 3 and communicate with a dedicated NFC reader and A4WP circuitry. In another embodiment, the controller may be configured to switch between the two frequencies of 6.78 MHz and 13.56 MHz such that the power is generated in sequential or alternative format.

These and other embodiments of the disclosure may be further illustrated with reference to the following and non-limiting examples. Example 1 is directed to a power transmission unit (PTU), comprising: a controller having a processor circuitry and a memory circuitry; a power amplifier for receiving an input to generate an amplified output; a resonator coil in communication with the power amplifier, the resonator coil configured to generate an A4WP magnetic charging field and a secondary signal; and a multiplexer in communication with the power amplifier and the resonator coil.

Example 2 is directed to the PTU of example 1, further comprising a Bluetooth Lowe Energy (BLE) communication platform for communicating with an external device.

Example 3 is directed to the PTU of example 1, further comprising a Near-Field Communication (NFC) reader to supply an NFC detectable signal to the multiplexer and to identify an NFC response received at the resonator coil.

Example 4 is directed to the PTU of example 3, wherein the controller directs the resonator coil to reduce the A4WP charging field when an NFC response signal is detected at the NFC reader.

Example 5 is directed to the PTU of example 4, wherein the controller continually detects the NFC signal while the resonator generates the A4WP magnetic field to charge an external device.

Example 6 is directed to the PTU of example 1, wherein the multiplexer further comprises circuitry with frequency selectivity to reject the out-of-channel interference and matching network.

Example 7 is directed to the PTU of example 1, wherein the controller directs the resonator coil to reduce the A4WP magnetic charging field if a proximal NFC device is detected.

Example 8 is directed to a power transmission unit (PTU), comprising: a controller having a processor circuitry and a memory circuitry; a power amplifier for receiving an input to generate an amplified output; a resonator coil in communication with the power amplifier, the resonator coil configured to sequentially generate an A4WP magnetic charging field and an NFC polling signal; and a multiplexer in communication with the power amplifier and the resonator coil.

Example 9 is directed to the PTU of example 8, wherein the multiplexer is configured to periodically generate NFC polling signal and interleave the A4WP magnetic charging field and the NFC polling signal.

Example 10 is directed to the PTU of example 8, wherein the resonator coil is configured to provide one or more of a short beacon signal and a long beacon signal to detect presence of a proximal chargeable device.

Example 11 is directed to the PTU of example 10, wherein the resonator is further programmed to detect a load variation in response to the detected proximal chargeable device.

Example 12 is directed to the PTU of example 10, further comprising a Bluetooth Low Energy (BLE) communication platform to communicate with the detected proximal chargeable device.

Example 13 is directed to the PTU of example 8, further comprising an NFC polling reader to receive NFC signal from a proximal NFC device when the NFC device is powered by an NFC field.

Example 14 is directed to a method to detect a Near-Field Communication (NFC) device proximal to a wireless charging station, comprising: generating an NFC signal and an NFC detection zone; generating a first magnetic field, the first magnetic field defining a charging zone to wirelessly charge an external device within the wireless charging zone; detecting presence of an NFC device at or near the NFC detection zone; generating a second magnetic field in response to detecting the NFC device; and confirming presence of the NFC device at or near the NFC detection zone while simultaneously generating the second magnetic field.

Example 15 is directed to the method of example 14, wherein confirming presence of the NFC device further comprises multiplexing an NFC signal and a magnetic field at a resonator coil.

Example 16 is directed to the method of example 15, wherein generating a second magnetic field in response to detecting presence of the NFC device further comprises reducing the first magnetic field to a predefined level.

Example 17 is directed to the method of example 16, further comprising continually generating the second magnetic field while detecting presence of the NFC device.

Example 18 is directed to the method of example 14, wherein confirming presence of the NFC device further comprises providing an indication of the NFC device presence.

Example 19. The method of example 14, further comprising communicating with a wireless charging (WC) receiver to decrease or increase WC field strength using Bluetooth Low Energy (BLE) signaling.

Example 20 is directed to the method of example 14, wherein the first magnetic field is defined by about 6.78 MHz frequency and the second magnetic field is defined by about 13.56 MHz frequency.

Example 21 is directed to a method to detect an NFC device proximal to a wireless charging station, comprising: generating a short beacon at a wireless charging station; detecting load modulation at the wireless charging station, the load modulation indicating presence of a proximal device; if the proximal device is detected, generating a long beacon; generating a Near-Field Communication (NFC) signal at a period subsequent to generating the short or the long beacon; and detecting a response to the NFC signal.

Example 22 is directed to the method of example 21, further comprising sequentially multiplexing an NFC signal and a magnetic field at a resonator coil.

Example 23 is directed to the method of example 21, further comprising generating the NFC signal subsequent to generating the short beacon.

Example 24 is directed to the method of example 21, further comprising generating the NFC signal subsequent to generating the long beacon.

Example 25 is directed to the method of example 21, further comprising receiving a Bluetooth Low Energy (BLE) advertisement from the NFC device.

Example 26 is directed to the method of example 21, further comprising detecting the response to the NFC signal through a resonator coil used of the wireless charging station.

Example 27 is directed to the method of example 21, further comprising generating a magnetic field for wirelessly charging a device if no proximal NFC device is detected.

Example 28 is directed to the method of example 21, further comprising communicating presence of a wireless charging (WC) receiver and the NFC device.

Example 29 is directed to a computer-readable non-transitory storage medium that contains instructions, which when executed by one or more processors result in performing operations comprising: generating a short beacon at a wireless charging station; detecting load modulation at the wireless charging station, the load modulation indicating presence of a proximal device; if the proximal device is detected, generating a long beacon; generating a Near-Field Communication (NFC) signal at a period subsequent to generating the short or the long beacon; and detecting a response to the NFC signal.

Example 30 is directed to the medium of example 29, further comprising sequentially multiplexing an NFC signal and a magnetic field at a resonator coil.

Example 31 is directed to the medium of example 29, further comprising generating the NFC signal subsequent to generating the short beacon.

Example 32 is directed to the medium of example 29, further comprising generating the NFC signal subsequent to generating the long beacon.

Example 33 is directed to the medium of example 29, further comprising receiving a Bluetooth Low Energy (BLE) advertisement from the NFC device.

Example 34 is directed to the medium of example 29, further comprising detecting the response to the NFC signal through a resonator coil used of the wireless charging station.

Example 35 is directed to the medium of example 29, further comprising generating a magnetic field for wirelessly charging a device if no proximal NFC device is detected.

Example 36 is directed to the medium of example 29, further comprising communicating presence of a wireless charging (WC) receiver and the NFC device.

While the principles of the disclosure have been illustrated in relation to the exemplary embodiments shown herein, the principles of the disclosure are not limited thereto and include any modification, variation or permutation thereof.

What is claimed is:

1. A power transmission unit (PTU), comprising:
    a controller having a processor circuitry and a memory circuitry;
    a power amplifier for receiving an input to generate an amplified output;
    a resonator coil in communication with the power amplifier, the resonator coil configured to generate an A4WP magnetic charging field and a secondary signal; and
    a frequency multiplexer in communication with the power amplifier and the resonator coil, wherein the frequency multiplexer is configured to detect nearby objects through frequency multiplexing while continually generating the A4WP magnetic charging field.

2. The PTU of claim 1, further comprising a Bluetooth Lowe Energy (BLE) communication platform for communicating with an external device.

3. The PTU of claim 1, further comprising a Near-Field Communication (NFC) reader to supply an NFC detectable signal to the multiplexer and to identify an NFC response received at the resonator coil.

4. The PTU of claim 3, wherein the controller directs the resonator coil to reduce the A4WP charging field when an NFC response signal is detected at the NFC reader.

5. The PTU of claim 4, wherein the controller continually detects the NFC signal while the resonator coil generates the A4WP magnetic field to charge an external device.

6. The PTU of claim 1, wherein the multiplexer further comprises circuitry with frequency selectivity to reject the out-of-channel interference and matching network.

7. The PTU of claim 1, wherein the controller directs the resonator coil to reduce the A4WP magnetic charging field if a proximal NFC device is detected.

8. A power transmission unit (PTU), comprising:
    a controller having a processor circuitry and a memory circuitry;
    a power amplifier for receiving an input to generate an amplified output;
    a resonator coil in communication with the power amplifier, the resonator coil configured to sequentially generate an A4WP magnetic charging field and an NFC polling signal; and
    a multiplexer in communication with the power amplifier and the resonator coil, wherein the multiplexer is configured to detect nearby objects through multiplexing while continually generating the A4WP magnetic charging field.

9. The PTU of claim 8, wherein the multiplexer is configured to periodically generate NFC polling signal and interleave the A4WP magnetic charging field and the NFC polling signal.

10. The PTU of claim 8, wherein the resonator coil is configured to provide one or more of a short beacon signal and a long beacon signal to detect presence of a proximal chargeable device.

11. The PTU of claim 10, wherein the resonator coil is further programmed to detect a load variation in response to the detected proximal chargeable device.

12. The PTU of claim 10, further comprising a Bluetooth Low Energy (BLE) communication platform to communicate with the detected proximal chargeable device.

13. The PTU of claim 8, further comprising an NFC polling reader to receive NFC signal from a proximal NFC device when the NFC device is powered by an NFC field.

14. A method to detect a Near-Field Communication (NFC) device proximal to a wireless charging station, comprising:
    generating an NFC signal and an NFC detection zone;
    generating a first magnetic field, the first magnetic field defining a charging zone to wirelessly charge an external device within the wireless charging zone;
    detecting presence of an NFC device at or near the NFC detection zone;
    generating a second magnetic field in response to detecting the NFC device; and
    confirming presence of the NFC device at or near the NFC detection zone while simultaneously generating the second magnetic field;
    wherein confirming presence of the NFC device further comprises multiplexing an NFC signal and a magnetic field at a resonator coil and wherein the multiplexer is configured to detect nearby objects through frequency multiplexing.

15. The method of claim 14, wherein generating a second magnetic field in response to detecting presence of the NFC device further comprises reducing the first magnetic field to a predefined level.

16. The method of claim 15, further comprising continually generating the second magnetic field while detecting presence of the NFC device.

17. The method of claim 14, wherein confirming presence of the NFC device further comprises providing an indication of the NFC device presence.

18. The method of claim 14, further comprising communicating with a wireless charging (WC) receiver to decrease or increase WC field strength using Bluetooth Low Energy (BLE) signaling.

19. The method of claim 14, wherein the first magnetic field is defined by about 6.78 MHz frequency and the second magnetic field is defined by about 13.56 MHz frequency.

20. A method to detect an NFC device proximal to a wireless charging station, comprising:
    generating a short beacon at a wireless charging station;
    detecting load modulation at the wireless charging station, the load modulation indicating presence of a proximal device;
    if the proximal device is detected, generating a long beacon;
    generating a Near-Field Communication (NFC) signal at a period subsequent to generating the short or the long beacon;
    detecting a response to the NFC signal; and
    sequentially multiplexing an NFC signal and a magnetic field at a resonator coil;
    wherein the multiplexer is configured to detect nearby objects.

21. The method of claim 20, further comprising generating the NFC signal subsequent to generating the short beacon.

22. The method of claim 20, further comprising generating the NFC signal subsequent to generating the long beacon.

23. The method of claim 20, further comprising receiving a Bluetooth Low Energy (BLE) advertisement from the NFC device.

24. The method of claim 20, further comprising detecting the response to the NFC signal through a resonator coil used of the wireless charging station.

25. The method of claim 20, further comprising generating a magnetic field for wirelessly charging a device if no proximal NFC device is detected.

26. The method of claim 20, further comprising communicating presence of a wireless charging (WC) receiver and the NFC device.

27. A computer-readable non-transitory storage medium that contains instructions, which when executed by one or more processors result in performing operations comprising:
    generating a short beacon at a wireless charging station;
    detecting load modulation at the wireless charging station, the load modulation indicating presence of a proximal device;
    if the proximal device is detected, generating a long beacon;
    generating a Near-Field Communication (NFC) signal at a period subsequent to generating the short or the long beacon; and
    detecting a response to the NFC signal; and
    multiplexing an NFC signal and a magnetic field at a resonator coil;
    wherein the step of multiplexing is configured to detect nearby objects.

28. The medium of claim 27, further comprising generating the NFC signal subsequent to generating the short beacon.

29. The medium of claim 27, further comprising generating the NFC signal subsequent to generating the long beacon.

30. The medium of claim 27, further comprising receiving a Bluetooth Low Energy (BLE) advertisement from the NFC device.

31. The medium of claim 27, further comprising detecting the response to the NFC signal through a resonator coil used of the wireless charging station.

32. The medium of claim 27, further comprising generating a magnetic field for wirelessly charging a device if no proximal NFC device is detected.

33. The medium of claim 27, further comprising communicating presence of a wireless charging (WC) receiver and the NFC device.

* * * * *